US008715817B2

(12) United States Patent
Striegler et al.

(10) Patent No.: US 8,715,817 B2
(45) Date of Patent: May 6, 2014

(54) GLASS CERAMIC PLATE

(75) Inventors: Harald Striegler, Ockenheim (DE); Otmar Becker, Langen (DE)

(73) Assignee: Schott AG, Mainz (DE)

( * ) Notice: Subject to any disclaimer, the term of this patent is extended or adjusted under 35 U.S.C. 154(b) by 896 days.

(21) Appl. No.: 12/386,962

(22) Filed: Apr. 24, 2009

(65) Prior Publication Data
US 2009/0305032 A1 Dec. 10, 2009

(30) Foreign Application Priority Data

Apr. 25, 2008 (DE) .......................... 10 2008 020 895

(51) Int. Cl.
*B32B 5/00* (2006.01)
*B05D 3/02* (2006.01)

(52) U.S. Cl.
USPC ........... 428/220; 428/450; 428/469; 428/697; 428/701; 428/702; 427/376.3; 427/376.6; 427/383.5

(58) Field of Classification Search
None
See application file for complete search history.

(56) References Cited

U.S. PATENT DOCUMENTS

| 2002/0084263 | A1* | 7/2002 | Wennemann et al. | ..... 219/460.1 |
| 2007/0056961 | A1 | 3/2007 | Shimatani et al. | |
| 2007/0295711 | A1* | 12/2007 | Striegler et al. | .......... 219/448.11 |
| 2008/0035896 | A1* | 2/2008 | Striegler et al. | ............ 252/520.3 |

FOREIGN PATENT DOCUMENTS

| DE | 35 03 576 C2 | 8/1986 |
| DE | 44 26 234 C1 | 3/1996 |
| DE | 197 21 737 C1 | 11/1998 |
| DE | 199 06 737 A1 | 9/2000 |
| DE | 10 2006 027 739 A1 | 12/2007 |
| EP | 1 170 264 B1 | 1/2002 |
| JP | 2003/338359 | 11/2003 |
| JP | 2004-193050 | 7/2004 |
| WO | WO 2006/072388 A1 | 7/2006 |
| WO | 1 837 314 A1 | 9/2007 |

OTHER PUBLICATIONS

Pfaff, Peter: New Possibilities for Decoration of Glass, Ceramic, and Porcelain [Neue Möglichkeiten zur Dekoration von Glas, Keramik und Porzellan], Silica Technology [Silikatechnik] 42/6, 1991, (p. 192-196).
Japanese Reference JP Kokoku H07-17409 (1991) (English translation, p. 1-5).
Landgraf, Günter, "Gold in Decoration of Glass and Ceramics," chapter 5, "Bonding and Adhesion," p. 167 ff. in: Gold, Progress in Chemistry, Biochemistry and Technology., ed.: H. Schmidbaur, 1999 John Wiley & Sons (5 pages).
GPP 071006, development name, Heraeus Co., Hanau (8 pages).

* cited by examiner

*Primary Examiner* — David Sample
(74) *Attorney, Agent, or Firm* — Pauley Petersen & Erickson

(57) ABSTRACT

A low-expansion glass ceramic plate, in which a black coating is applied directly or indirectly to at least some areas of at least one side of the plate and the coating contains precious metal. In order to produce a glass ceramic plate of this type that is opaque, while simultaneously retaining a sufficient degree of its thermal stability, according to this invention, the precious metal content in the coating is ≥50 wt. %, the bismuth oxide content in the coating is at most 20 wt. %, and the layer thickness of the coating is at least 200 nm.

26 Claims, 1 Drawing Sheet

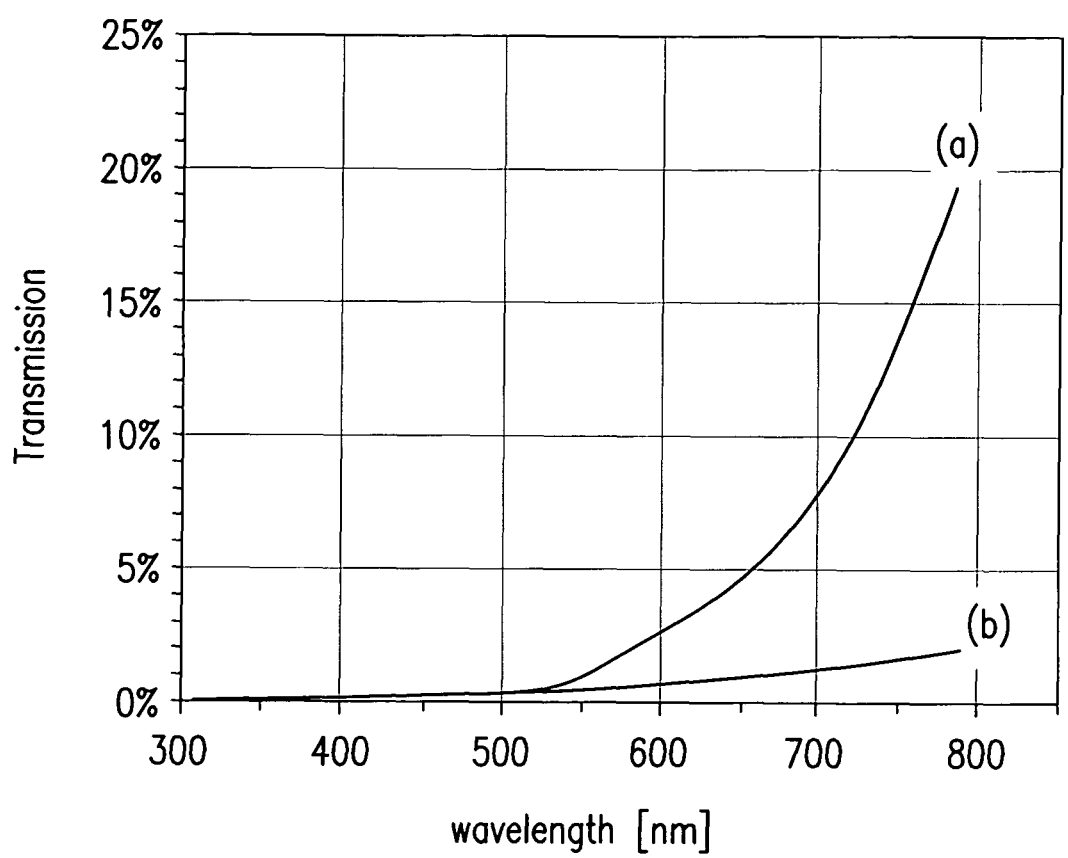

GLASS CERAMIC PLATE

BACKGROUND OF THE INVENTION

This invention relates to a glass ceramic plate, particularly a glass ceramic plate for a cooktop, with a plate top surface that forms the cooking side and a plate underside oriented away from the plate top surface, and a coating is applied directly or indirectly to at least some areas of the plate underside and the coating contains precious metal.

DISCUSSION OF RELATED ART

The black glass ceramic plates currently available are composed either of a volume-colored black glass ceramic or of a colorless glass ceramic with a black undercoating. Because electronic displays are increasingly integrated into cooktops, volume-colored glass ceramics are becoming more and more disadvantageous because they are not sufficiently transparent for red light. The embodiment of a display area with a color display, for example composed of various LEDs or color LCD screens is not possible with the current volume-colored translucent glass ceramics, such as CERAN HIGHTRANS® and CERAN SUPREMA®.

By contrast, the manufacture of a display region, which permits the monochrome or multicolor display of data, such as heating level, recipes and the like, without limitation as to color, is successfully achieved using colorless or nearly colorless glass ceramics, such as CERAN CLEARTRANS® according to European Patent Reference EP 1 837 314 A1, that have an opaque coating on the underside by simply leaving an opening in the undercoating in the region of the display, such as taught by Japanese Patent Reference JP2003-338359 A.

The undercoating prevents elements inside the cooktop, such as cables, heating elements, electronic components, and the metal structure, from being visible. Depending on the requirements, particularly with regard to thermal load resistance, the undercoating can be composed of one or more precious metal layers, sol-gel systems, silicone paints and the like. Two options are currently in use for manufacturing black cooktops out of transparent glass ceramic.

In the first option, the glass ceramic has a porous layer composed of glass and thermally stable black pigments, for example spinels of the Cr—Fe—Co—Mn type, and this is overlaid with a silicone layer that is pigmented until it is opaque. By leaving an opening in the two layers in the display region, it is possible to integrate displays of any color into the glass ceramic plate. This method permits an inexpensive manufacture, but has the disadvantage that glass ceramic plates of this kind are not suitable for temperature loads of 300° C. for long periods, or over 500° C. for short periods, because with a corresponding thermal load, the decomposition of the silicone causes a grayish or brownish discoloration of the coating system.

In the second option, high-quality glass ceramic plates with precious metal-based undercoatings are used, such as Japanese Reference Kokoku H07-17409, for example with precious metal preparation SL-900X-3. Because of the metal oxide composition, black precious metal coatings have an extremely high thermal stability so that even when exposed to temperatures above 500° C. for several hours, no discoloration occurs. The black precious metal layers of commercially available glass ceramic plates are mainly composed of gold, bismuth, and iron and have a layer thickness of 300 to 800 nm. In current commercially available cooktops with black precious metal coatings on the underside, the black precious metal layer is essentially composed of at most 20 wt. % gold, more than 25 wt. % bismuth oxide, more than 25 wt. % iron oxide, and approximately 1-10 wt. % titanium oxide. Using the known composition and layer thickness has achieved a transmission of only 1.5%, $\tau_{vis}$ with illuminant D65 according to DIN EN 410, shown in FIG. 1, curve a, in the range of visible light (380 to 780 nm). The literature mentions a minimal average transmission of 1.7-2.2%, Japanese Reference JP Kokoku H07-17409, and U.S. Patent Reference US2007/0056961 A1. The translucency of the precious metal layers is therefore very low, and comparable to the transmission of volume-colored black glass ceramics, thus as a rule sufficiently preventing visibility into the interior of a cooktop. As described at the beginning, in order to produce a display region, an opening can be left in the black precious metal layer above the display (LED, LCD), thus making it possible to provide a monochrome or multicolor display inside a cooktop.

When illuminated with halogen lamps of the kind currently used in modern fame extraction hoods, however, the black precious metal films currently in use are not completely opaque, such as under powerful illumination, some details inside the cooktop, such as cables, remain visible. This problem has already been addressed by Japanese Patent Reference JP2003-338359 (A).

For this reason, with high-quality cooktops of volume-colored glass ceramic, a silicone coating that is pigmented until it is opaque is applied to the underside as a "stray light covering" that reduces the transmission in the range of visible light to 0%, for example making the glass ceramic plate completely opaque as taught by German Patent References DE 035 03 576 C2 and DE 044 26 234 C1. With volume-colored black glass ceramic, the discoloration of the silicone layer that is inevitable at thermal loads of greater than 500° C. is not visible to the user, such as when looking at the glass ceramic plate once it is installed into the cooktop.

But in colorless glass ceramics having a black precious metal undercoating to which a silicone layer, which is pigmented until it is opaque, is applied, the discoloration of the silicone layer after thermal loading, such as 1 h at 530° C., is very clearly visible to the user. In fact, the glass ceramic plate appears darker to the user in the thermally loaded region, the hot region, than in the surrounding cold region. The discoloration is particularly visible if the glass ceramic plate is only sparingly decorated on top in the hot region, as is the current trend, and when the glass ceramic plate is viewed in diffuse daylight. The transmission of a colorless glass ceramic cooktop, glass ceramic plate, with a black precious metal undercoating cannot currently be further reduced by applying a silicone layer, which is pigmented until it is opaque, to the precious metal layer, without discolorations occurring as a result of thermal loading.

Increasing the layer thickness of the black precious metal layer from the usual dimension of 300-800 nm to greater than 800 nm, such as through the use of a coarser screen printing weave, is also unable to produce a complete opacity because the black precious metal coating became cracked at layer thicknesses of greater than 800 nm, as a result of which the transmission did not decrease but rather increased and in addition, the cooktop itself became unsightly. The cracks are due to stresses in the precious metal layer itself and also to stresses between the glass ceramic and the precious metal film due to the different intensities of thermal expansion of the two systems.

In addition, once a coarser screen printing weave, such as a mesh of 54 to 64 was used, it was no longer possible to print high-definition edges, for example when leaving an opening for the display window.

SUMMARY OF THE INVENTION

This thus led to an object of providing a colorless glass ceramic cooktop with a coating, in particular an undercoating, in which: the undercoating should lend the glass ceramic plate a black appearance; the undercoating, together with the glass ceramic, should produce an opaque glass ceramic plate whose transmission in the range of visible light should be less than 1%, $\tau_{vis} \leq 1\%$ with illuminant D65 according to DIN EN 410; the undercoating should be color-stable at a thermal load of 300° C. for long periods and at a thermal load of above 530° C. for short periods; high-definition openings can be left in the undercoating in the region of displays or windows; and the undercoating, in connection with the glass ceramic, fulfills all other utilization properties that are required for use of the glass ceramic plate as a cooktop or window, for example a fireplace window, in particular scratch-resistance, bonding strength, color stability in relation to adhesive, silver conductive paste, and foods, and the preservation of mechanical strength of the glass ceramic plate.

DETAILED DESCRIPTION OF THE INVENTION

The opaque undercoating with the desired properties can be provided by increasing the precious metal content in the precious metal preparation, changing the precious metal and metal composition of the precious metal preparation, and taking into account certain baking requirements.

Particularly suitable as substrate materials for the glass ceramic plate to be coated according to this invention are glass ceramics of the $Li_2O$—$Al_2O_3$—$SiO_2$ type, such as colorless glass ceramic with a thermal expansion of $-10 \cdot 10^{-7}$ $K^{-1}$ to $+30 \cdot 10^{-7}$ $K^{-1}$ in the temperature range from 30 to 500° C., whose known composition is given, among other places, in the following Table 1.

TABLE 1

Composition of suitable glass ceramic substrates

| element oxide | glass ceramic composition [wt. %] | | |
|---|---|---|---|
| $SiO_2$ | 66-70 | 50-80 | 55-69 |
| $Al_2O_3$ | >19.8-23 | 12-30 | 19-25 |
| $Li_2O$ | 3-4 | 1-6 | 3-4.5 |
| MgO | 0-1.5 | 0-5 | 0-2.0 |
| ZnO | 1-2.2 | 0-5 | 0-2.5 |
| BaO | 0-2.5 | 0-8 | 0-2.5 |
| $Na_2O$ | 0-1 | 0-5 | 0-1.5 |
| $K_2O$ | 0-0.6 | 0-5 | 0-1.5 |
| $TiO_2$ | 2-3 | 0-8 | 1-3 |
| $ZrO_2$ | 0.5-2 | 0-7 | 1-2.5 |
| $P_2O_5$ | 0-1 | 0-7 | — |
| $Sb_2O_3$ | usual quantities | 0-4 | usual quantities |
| $As_2O_3$ | usual quantities | 0-2 | usual quantities |
| CaO | 0-0.5 | 0 | 0-1.5 |
| SrO | 0-1 | 0 | 0-1.5 |
| $Nd_2O_3$ | | | 0.004-0.4 |
| $B_2O_3$ | | | 0-1 |
| $SnO_2$ | | | 0-0.4 |
| Source | EP 1 170 264 B1 claims 14-18 | JP (A) 2004-193050 | EP 1 837 314 A1 |

The black precious metal film should be composed of at least 50 wt. % gold and platinum, primarily to reduce the transmission and to produce the black color, and also chromium oxide and bismuth oxide, to form an impermeable, closed film, and silicon oxide, nickel oxide, and possibly boric oxide, zirconium oxide, rhodium oxide, or other metal oxides as bonding agents.

Increasing the precious metal content to 50 wt. % and more, in relation to the total composition of the baked precious metal film, makes it possible, for example using a screen mesh with a fineness of 100-40, to apply a sufficiently high-definition precious metal layer onto the glass ceramic surface, whose average transmission $\tau_{vis}$, glass ceramic with the precious metal layer, is less than 1%, in particular only 0.4-0.6%, absolute transmission below 2% at 750 nm, shown in FIG. 1, curve b, and whose layer thickness, after baking, is less than 450 nm, preferably only 240 to 380 nm, so that no cracks occur.

The baked coating should contain 40-60 wt. % gold and 10-20 wt. % platinum as well as at least 2 wt. % and at most 8 wt. % chromium oxide, at least 5% and at most 20% bismuth oxide, at least 10 wt. % and at most 20 wt. % silicon oxide, as well as 1-5% nickel oxide and 0-3% zirconium oxide, boric oxide, or other metal oxides, in particular of metals that are known as bonding agents in precious metal layers (see Landgraf, Günter, "Gold in Decoration of Glass and Ceramics," chapter 5, "Bonding and Adhesion," p. 167 ff. in: Gold, Progress in Chemistry, Biochemistry and Technology., ed.: H. Schmidbaur, 1999 John Wiley & Sons).

The metals can be used as sulforesinates in the pigment paste and the gold can also be used in the form of a gold-(III)-chloride solution. The viscosity can be optimally adjusted through the addition of additional resins and solvents. For screen printing, a viscosity of 1000-2000 mPa·s, at a shear gradient of 200 $s^{-1}$, is preferable. The coating of the glass ceramic plate, however, can also take place using other methods, such as spraying, pad printing, or stamping methods. In principle, it is also possible to apply the precious metal film by sputtering techniques. However, when using sputtering or spraying methods, the masking technology required to leave an opening in the coating in the display region is complex from a production standpoint and thus rather disadvantageous.

The baking of the precious metal preparation should occur at the lowest possible temperature and for the shortest possible holding time at the maximum temperature, to obtain a uniform black undercoating.

The maximum temperature, however must be at least 750° C. so that the undercoating is sufficiently scratch resistant.

The maximum temperature should not exceed 850° C. because a higher temperature causes the glass ceramic to soften and, depending on the size of the plate, results in uneven, more or less warped glass ceramic plates.

The holding time at the maximum temperature should be as short as possible (1-30 min.). Otherwise, light gray flakes up to 30 cm in size are produced, most often in the middle of large (80 cm×60 cm) glass ceramic plates made of glass ceramic. The holding time is normally determined by the homogeneity of the oven, the temperature distribution in the baking oven which should be selected so that every point on a plate is at least temporarily, for example 1 min., heated to the maximum temperature. The light gray discolorations are due to the local accumulation of large high-quartz mixed crystals in the glass ceramic due to increased formation and accelerated growth of the crystals in the middle of the glass ceramic plate. The trigger for the accelerated growth and increased formation of crystals directly beneath the vitreous zone in the bulk of the glass ceramic is the bismuth from the precious metal layer. At temperatures above 750° C., bismuth diffuses out of the precious metal layer into the glass ceramic, and at temperatures above 750° C. passes through the approximately 100-300 nm thick vitreous zone of the glass ceramic within 90-120 min. Because the vitreous zone is thicker at the edges of a glass ceramic plate than in the middle, as soon as the bismuth passes through the vitreous zone and penetrates into the bulk material of the glass ceramic, it accelerates the nucleation and seed growth of the high-quartz mixed crystals, starting in the middle of the plate. Because light refracts differently in the regions with increased crystallization than in the unchanged regions, this produces the color differences referred to as gray discolorations. Homogeneous black glass ceramic plates are thus only obtained if the diffusion of the bismuth into the bulk material of the glass ceramic is inhibited by reducing the holding time at the maximum temperature and by selecting the lowest possible maximum temperature.

The formation of gray flakes does not occur if the above-mentioned precious metal preparation does not contain bismuth, the bismuth can be replaced, for example, with boron. The resulting bismuth-free precious metal films are then in fact black, but of an undesirably high porosity as a result of which, for example, adhesives of the type usually used today to bond the glass ceramic plates to the metal housing of the cooktop produce dark discolorations at the wetted regions of the glass ceramic plate, which are visible to the user. Comparable discolorations also occur at room temperature, such as 20° C., in the presence of silver conductive paste or foods such as cooking oil. The sealing of such a porous precious metal layer with a silicone paint likewise leads to a dark discoloration that is visible to the user, with a subsequent thermal load, such as 1 h at 530° C., of the silicone layer.

It is thus not possible to eliminate the use of bismuth in the precious metal layer if a black, closed precious metal film is produced.

By contrast with the porous, bismuth-free precious metal films, printing a silicone paint onto the back of the described bismuth-containing black precious metal film according to this invention yields a glass ceramic plate that is both color-stable with a thermal load up to above 500° C. and also extremely resistant to the effects of foods.

The resistance of the black cooktop to foods can, for example, be necessary in cooktops for gas applications, particularly when the gas burners produce temperatures of up to 530° C. on the underside of the glass ceramic. In glass ceramic plates for gas applications, the openings in the glass ceramic cooktop, which have the gas burners positioned in their centers, can allow foods to pass through, which are then deposited on the underside of the glass ceramic plate and become baked onto it. The bare black precious metal layer at the soiled location can become damaged by the baked-on food even after a brief use of the cooktop and a conspicuous flaking would be visible to the user in the contaminated region.

But if the black precious metal layer is back-printed with a silicone layer, or another organic coating, such as of polyamide, polyimide, or a sol-gel layer, then the same contamination with foods does not cause flaking, even though the organic protective coating decomposes at temperatures above 500° C. Even the decomposed protective layer continues to prevent foods from coming into contact with the underside of the glass ceramic plate to such a degree that they damage the precious metal layer.

It can be necessary for the glass ceramic plate to be resistant to silver conductive paste at high temperatures, approximately 350-500° C., if for example in cooktops for induction applications, temperature sensors are mounted to the underside of the glass ceramic plate in the hot region. Without another coating on the black precious metal layer, with the occurrence of thermal loading, the silver conductive paste would cause a discoloration in the coating, which would be visible to the user. With a silicone layer on the black precious metal layer, however, the silver conductive paste does not cause discoloration because the silicone layer functions as a partition between the conductive paste and the precious metal layer that provides the color.

In comparison to volume-colored black glass ceramic, black undercoated glass ceramics are advantageous if the top surface decoration of such a glass ceramic plate contains effect pigments (see Pfaff, Peter: New Possibilities for Decoration of Glass, Ceramic, and Porcelain [Neue Möglichkeiten zur Dekoration von Glas, Keramik und Porzellan], Silica Technology [Silikatechnik] 42/6, 1991, p. 196). This is because the metallic-iridescent effect of the top surface decoration stands out better on the above-described black undercoated glass ceramics than on black volume-colored glass ceramics. In this case, using the black precious metal coating according to this invention can be desirable even when no spaces remain open for displays.

Other creative effects can be produced by combining the black precious metal coating with other layers such as silver-coloring, gold-coloring, or copper-coloring precious metal layers or enamel layers. Thus, for example, with a silver precious metal layer, first a dot pattern is provided on the underside of the glass ceramic plate, which is then backed with the black precious metal color.

Openings can be maintained in the black precious metal color not only for displays in the display region, but also for other lighting elements in the hot region or in the vicinity of or near the hot region, for example as described in PCT International Publication WO 2006/072388 A1 and German Patent Reference DE 199 06 737 A1.

In another embodiment, the black precious metal layer is built up of two or more layers by printing corresponding dilutions of the above-described precious metal preparation according to this invention one on top of another, possibly also using a screen mesh finer than 100-40, such as a screen mesh of 140-31. By leaving openings in one or the other color layer, it is possible to produce transparent regions after the coating system is baked, which regions differ in color from the opaque or less transparent regions, the transparent regions are browner. The average transmission of a more transparent region can, for example, be set to $\tau_{vis}$=4-5%. It is also possible, in a fashion similar to the one described in German Patent Reference DE 10 2006 027 739, for LEDs to be situated beneath such a more transparent region, which are then visible only when switched on, but remain largely hidden behind the precious metal coating when switched off.

Exemplary Embodiments

Example 1

Black Undercoated, Opaque Glass Ceramic Plate for a Cooktop

A colorless glass ceramic plate that was smooth on both sides, approximately 80 cm long, 60 cm wide, and 4 mm thick, with the composition according to European Patent Reference EP 1 837 314 A1 (Table 1, right column) was coated on its top surface with a decorative color according to German Patent Reference DE 197 21 737 C1 and then ceramified.

Then the precious metal preparation according to this invention (see GPP 071006, development name, Heraeus Co., Hanau) was applied to the underside of the ceramified glass ceramic plate by screen printing using screen mesh of 100-40.

The display region was left open or uncoated. The coating was dried for approximately 1 min. at 90° C. in a current of hot air. Then the coated glass ceramic was heated at a rate of 3 K/min. to 800° C., baked for 10 min. at 800° C., and then cooled at a rate of 5 K/min. to 20° C. After the baking, the underside of the glass ceramic plate was provided with a homogeneous black coating.

The metal content of the coloring was 12 wt. %, 88 wt. % annealing loss. The precious metal film was composed in weight percent of 50% gold, 17% platinum, 14% bismuth oxide, 11% silicon oxide, 5.0% chromium oxide, 2.3% nickel oxide, and 0.7% zirconium oxide.

The layer thickness of the baked precious metal coating was 300±40 nm.

The finished glass ceramic plate was installed as a cooktop in a ceramic stovetop for an induction application.

The opacity was checked by inspecting the installed cooktop under illumination with halogen lamps that were integrated into a commercially available fume extraction hood. Because structures inside the cooktop itself could not be seen, even from extreme proximity, a distance of approximately 10 cm from the top surface of the cooktop, the undercoating was determined to be opaque. The spectral transmission of the undercoated glass ceramic plate, without top surface decoration, in the range of visible light was only 0.5% ($\tau_{vis}$ with illuminant D65 according to DIN EN 410, calculated from the transmission curve in FIG. 1, curve b).

The color stability in relation to adhesive was tested by applying a 10-cm-long glue strip (Pactan 7076) to the coating and hardening it according to the manufacturer's instructions. When looking through the glass ceramic, from the user point of view, no discoloration was visible. The coating was thus determined to produce a sufficient seal in relation to the adhesive.

The color stability under thermal load was tested by heating the coated glass ceramic plate for 95 hours at 415° C. and then for 1 hour at 530° C. In the subsequent color tone comparison of the untreated and treated samples, no color difference was apparent to the average eye.

The color tone of the coated glass ceramic was determined with a spectral photometer (Mercury 2000, Datacolor Co.) (illuminant: D65, observation angle: 10°). The color value was specified in accordance with the CIELAB system (DIN 5033, part 3 "color measurement numbers"). According to DIN 6174, the color difference was ΔE=0.9.

TABLE 2

Color values before and after thermal loading

| thermal loading | color value | | |
|---|---|---|---|
| | L* | a* | b* |
| after baking (delivery state) | 39.0 | 1.1 | 7.1 |
| after thermal loading (95 h 415° C. & 1 h 530° C.) | 38.4 | 1.8 | 6.9 |

The bonding strength of the coating was also sufficient after thermal loading. It was tested using the Tesa test where a strip of transparent adhesive film was rubbed into place on the undercoating and then abruptly torn off (Tesafilm type 104, Beiersdorf AG). Because no detached pieces of coating on the adhesive strip were apparent to the normal eye, the bonding of the coating to the glass ceramic was determined to be sufficient even after thermal loading.

The scratch resistance of the coating was sufficient. A rounded metal spike with a curvature radius of 0.5 mm that was loaded with 500 g was unable to produce scratches that were visible from above, from the user point of view, when the cooktop was in the installed position.

The bending strength of the black-coated glass ceramic cooktop was at least 110 MPa (average determined in accordance with DIN EN 1288-5), a standard strength for cooktops.

An LCD display was mounted and operated in the region in which the black undercoating was left open. Because there was no undercoating in the display region and because the glass ceramic was virtually colorless, information could be displayed in any color.

Example 2

Black Undercoated Glass Ceramic Plate for a Cooktop with Silicone Protective Layer A glass ceramic plate with bores for gas burners was provided with the black precious metal coating according to this invention, as in Example 1. With screen printing (screen mesh of 54-64), a layer of a heat-resistant, black silicone paint (GSX, Daishin Paint Co.) was also applied to the underside of the black precious metal layer. The silicone paint was dried for 5 min. at 180° C. and then baked for 30 min. at 400° C.

The finished glass ceramic plate was installed in a stovetop for a gas application. The resistance to baked-on foods was tested by wetting the underside of the cooktop in the vicinity of the gas burners with foods (oil, soy sauce) (0.1 g oil or soy sauce, distributed over 9 cm$^2$) and the foods were then baked on as the device was operated at maximum power. The cooktop was wetted with foods a total of three times at the same location and then operated for 1 h at maximum power.

Then the glass ceramic plate in the region in which the foods had been applied was observed with the normal eye from above, from the user point of view, and assessed as to whether the baked-on foods had caused detectable flaking and whether the temperature loading had caused detectable discolorations. Because no damage or discolorations were visible to the user, the black-coated glass ceramic plate was determined to be sufficiently resistant to baked-on foods.

The color stability of the layer system (black precious metal layer, back-printed with the silicone layer) was inspected by comparing the heated region, the hot region of the cooktop, to the unheated region, the cold region of the cooktop. No color difference was detectable with the normal eye.

In addition, the color values of both regions were measured with a spectral photometer (Mercury 2000, Datacolor Co.) (illuminant: D65, observation angle: 10°). The color value was specified in accordance with the CIELAB system (DIN 5033, part 3 "color measurement numbers"). According to DIN 6174, the color difference was ΔE=0.3.

TABLE 3

Color values before and after thermal loading

| thermal loading | color value | | |
|---|---|---|---|
| | L* | a* | b* |
| after baking (delivery state, "cold region") | 36.1 | 2.0 | 2.9 |

TABLE 3-continued

Color values before and after thermal loading

| thermal loading | color value | | |
|---|---|---|---|
| | L* | a* | b* |
| after thermal loading (1 h 530° C., "hot region") | 36.1 | 1.9 | 3.2 |

Note: The two samples "in the delivery state" from Examples 1 and 2 (Table 2 and Table 3) differ slightly in color tone. The color difference is due to process-related color differences in the glass ceramic substrate.

FIG. 1 a) spectral transmission of a competitive sample of colorless glass ceramic with black undercoating based on a precious metal preparation.

b) spectral transmission of -CERAN CLEARTRANS®, black undercoated with the precious metal preparation according to the invention GPP 071006 (Heraeus, Hanau)

German Patent Reference 10 2008 020 895.7, filed 25 Apr. 2008, the priority document corresponding to this invention, to which a foreign priority benefit is claimed under Title 35, United States Code, Section 119, and its entire teachings are incorporated, by reference, into this specification.

What is claimed is:

1. A glass ceramic plate, comprising an opaque black baked coating applied directly or indirectly to at least some areas of at least one side of the plate and the coating contains precious metal and bismuth oxide, and a precious metal content in the coating being ≥50 wt. %, a bismuth oxide content in the coating being at most 20 wt. %, and a layer thickness of the coating being at least 260 nm, wherein the baked coating contains 40-60 wt. % gold and 10-20 wt. % platinum, wherein the glass ceramic plate in the region coated with the coating has a transmission in a range of visible light ($\tau_{vis}$) less than 1%.

2. The glass ceramic plate as recited in claim 1, wherein the metal content in the coating is of at least 65 wt. % gold and platinum.

3. The glass ceramic plate as recited in claim 2, wherein the coating contains 50-60 wt. % gold and 15-20 wt. % platinum.

4. The glass ceramic plate as recited in claim 3, wherein the coating contains chromium oxide.

5. The glass ceramic plate as recited in claim 4, wherein the chromium oxide content in the coating is at least 2 wt. % and at most 8 wt. %.

6. The glass ceramic plate as recited in claim 5, wherein the bismuth oxide content in the coating is at least 5 wt. % to provide an impermeable, closed black film.

7. The glass ceramic plate as recited in claim 6, wherein the coating contains silicon oxide, nickel oxide, zirconium oxide, boric oxide, or combinations thereof.

8. The glass ceramic plate as recited in claim 7, wherein the coating has a silicon oxide content of at least 10 wt. % and at most 20 wt. % and/or a nickel oxide content of at least 1 wt. % and at most 5 wt. % and/or a zirconium oxide content of at most 3 wt. %.

9. The glass ceramic plate as recited in claim 8, wherein the layer thickness of the coating is less than or equal to 450 nm.

10. The glass ceramic plate as recited in claim 9, wherein the layer thickness of the coating is in the range between 260 and 380 nm.

11. The glass ceramic plate as recited in claim 10, wherein an organic silicone-containing layer, including a silicone paint, a polyamide-containing layer, a polyimide-containing layer, or a sol-gel layer, is directly or indirectly applied to the coating.

12. The glass ceramic plate as recited in claim 11, wherein a thermally conductive layer of a silver-containing paste is applied to at least some areas of the coating.

13. The glass ceramic plate as recited in claim 12, wherein a decorative layer that contains effect pigments is applied to at least some areas of the top surface of the plate.

14. The glass ceramic plate as recited in claim 13, wherein an intermediate layer is positioned in at least some areas between the coating and at least one side of the plate.

15. A method for manufacturing the glass ceramic plate recited in claim 1, comprising:
drying the coating at 20° C.-150° C.; and
baking a dried layer of the coating for a duration of at less than 30 min. at 750° C.-850° C.

16. The glass ceramic plate as recited in claim 1, wherein the coating contains chromium oxide.

17. The glass ceramic plate as recited in claim 1, wherein the bismuth oxide content in the coating is at least 5 wt. % to provide an impermeable, closed black film.

18. The glass ceramic plate as recited in claim 1, wherein the coating contains silicon oxide, nickel oxide, zirconium oxide, boric oxide, or combinations thereof.

19. The glass ceramic plate as recited in claim 1, wherein the layer thickness of the coating is less than or equal to 450 nm.

20. The glass ceramic plate as recited in claim 1, wherein an organic silicone-containing layer, including a silicone paint, a polyamide-containing layer, a polyimide-containing layer, or a sol-gel layer, is directly or indirectly applied to the coating.

21. The glass ceramic plate as recited in claim 1, wherein a thermally conductive layer of a silver-containing paste is applied to at least some areas of the coating.

22. The glass ceramic plate as recited in claim 1, wherein a decorative layer that contains effect pigments is applied to at least some areas of the top surface of the plate.

23. The glass ceramic plate as recited in claim 1, wherein an intermediate layer is positioned in at least some areas between the coating and at least one side of the plate.

24. The glass ceramic plate as recited in claim 1, wherein the coating is of two or more individual layers situated one on top of another.

25. The glass ceramic plate as recited in claim 1, wherein the layer thickness of the coating is in the range from about 300 to 380 nm.

26. The glass ceramic plate as recited in claim 17, wherein the opaque coating is color stable when in contact with each of a glue, a silver conductive paste, and food, and has an spectral transmission in the range of visible light of not greater than 0.5%.

* * * * *